(12) United States Patent
Takiguchi et al.

(10) Patent No.: US 6,249,640 B1
(45) Date of Patent: Jun. 19, 2001

(54) SYSTEM AND METHOD FOR RAPIDLY DECODING SUB-PICTURES IN A DVD PLAYER

(75) Inventors: Osamu Takiguchi; Takumi Nagasako, both of Tokyo; Katsuhiko Muromachi, Kanagawa, all of (JP)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/049,890

(22) Filed: Mar. 27, 1998

(51) Int. Cl.[7] ...................................................... H04N 5/91
(52) U.S. Cl. .............................. 386/82; 386/125; 386/126
(58) Field of Search .................................... 386/1, 45, 46, 386/82, 95–96, 111, 125–126, 131, 98; 348/468

(56) References Cited

U.S. PATENT DOCUMENTS 5,963,704 * 10/1999 Mimura et al. ...................... 386/126
6,035,095 * 3/2000 Kaneshige et al. .................. 386/125
6,064,796 * 5/2000 Nakamura et al. ..................... 386/95

* cited by examiner

Primary Examiner—Wendy Garber
Assistant Examiner—Christopher Onuaku

(57) ABSTRACT

The purpose of the present invention is to improve the rapid SPU playback scheme in a DVD player. In order to achieve this end, the method in accordance with the invention comprises the steps of: comparing the system time clock (STC) with the execution time of an instruction set that provides display control in the sub-picture units (SP_DCSQ_STM_N), forcing the display of pixel data (PXD) contained in a sub-picture unit to suspend operation and to proceed to instruction interpretation of the instruction set in a next sub-picture unit if said comparison means determines, when the sub-picture units are being rapidly played back, that the system time clock performing a rapid increment operation has a greater value than the execution time of the instruction set at least one ahead (SP_DCSQ_STM_N+1) and continuously repeating the instruction interpretation until the execution time of the instruction set coincides with the system time clock.

20 Claims, 2 Drawing Sheets

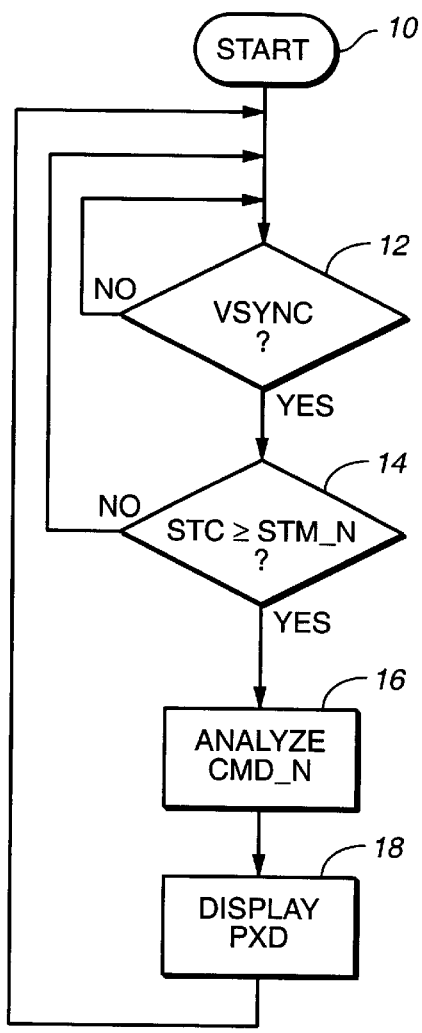
FIG._1
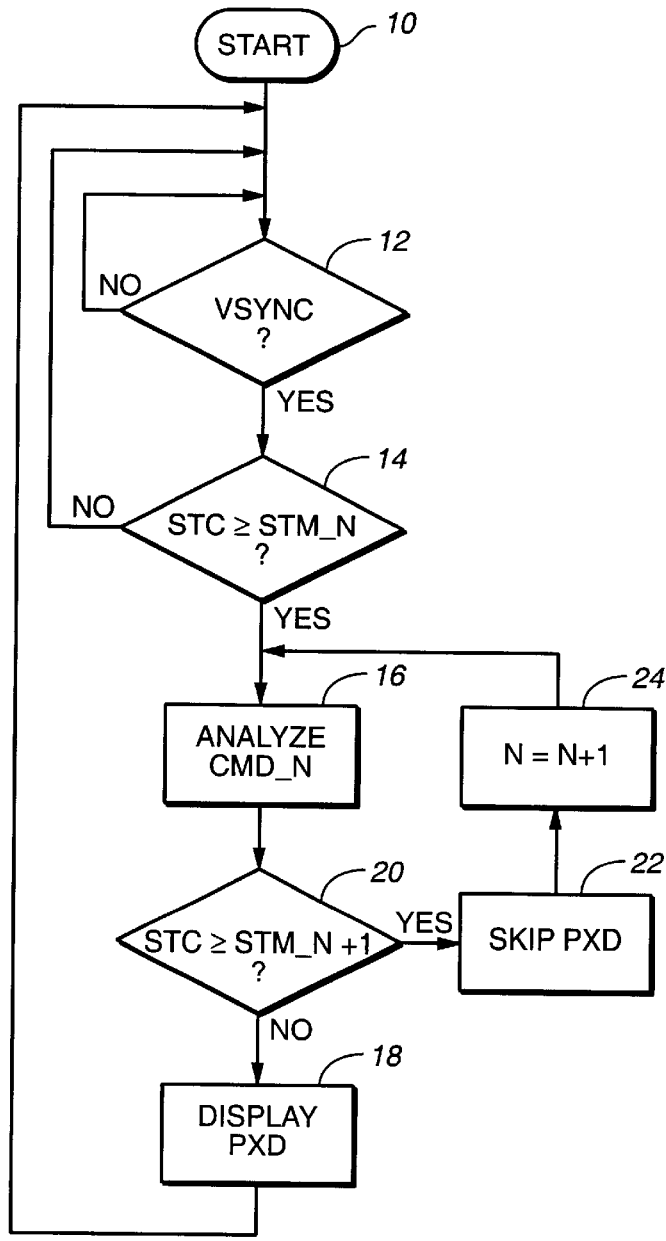
FIG._2

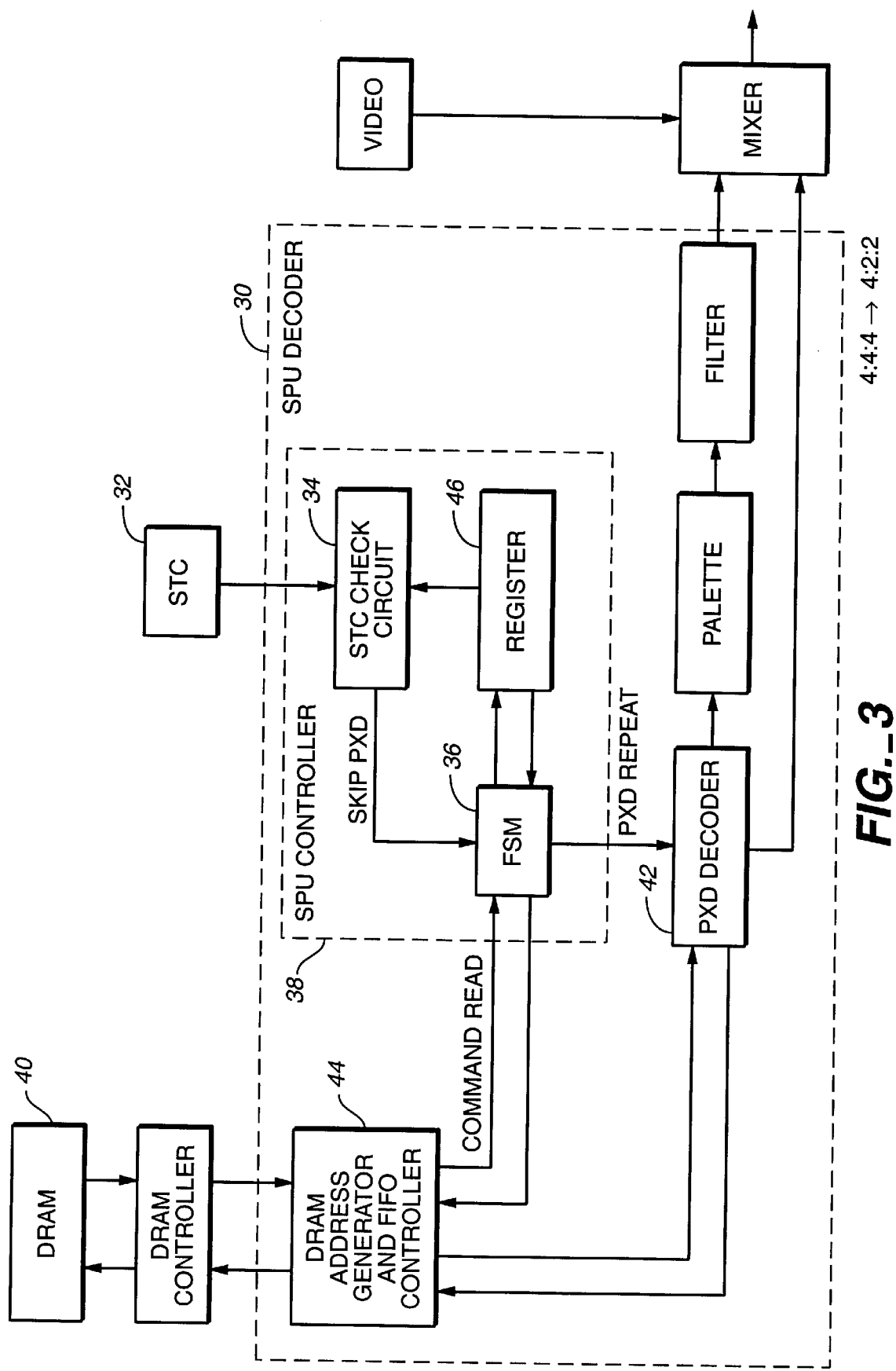
FIG._3

SYSTEM AND METHOD FOR RAPIDLY DECODING SUB-PICTURES IN A DVD PLAYER

BACKGROUND OF THE INVENTION

1. Field of the Invention

The present invention generally relates to a signal processing system and method in a DVD (Digital Video Disk) player. In particular, the invention relates to a system and method for decoding the data read out and relieved of a copy-protect at the front end and then performing a high quality and high speed playback of a sub-picture at the backend, which is connected to a television set, of a DVD player.

2. Description of the Related Art

In a conventional TV or VCR, information regarding sub-pictures, which are for example subtitles of a movie or lyrics of a karaoke song, is not separated from that of main pictures. In the DVD Standard decided upon in September, 1996, however, main pictures are encoded into a hierarchy of Video_Stream of the MPEG (Moving Picture Experts Group) Standard whereas sub-pictures are separated from the main picture information and stored into Private_Stream of the MPEG Standard as an independent form of a sub-picture unit (SPU). By constructing the sub-picture unit as a unit independent of the main pictures, it is possible to display multi-language subtitles which can be selected by the user and overlapping interactive sub-pictures. A sub-picture is said to be interactive when the sub-title can be controlled with respect to its color, contrast and display location in response to a selection made by a user.

Since a main picture and a sub-picture are independently stored in different streams, it is necessary to perform playback synchronously both between the main and sub pictures and between the video and audio data. In particular, when the DVD sub-picture is played back, the synchronization technique for special playbacks such as rapid and slow playbacks characteristics of the storage medium is critical.

In the DVD, the SPU's consist of a series of units. Each sub-picture unit comprises a PTS (Presentation Time Stamp) which specifies the time to start the decoding, an SPUH (Sub-Picture Unit Header) which shows the configuration of the unit, an SP_DCSQT (Sub-Picture Display Control Sequence Table) which is a control code consisting of a plurality of instruction sets each of which has its own execution time, and a PXD (Pixel Data) which is a bit map data to be displayed in response to an instruction from the instruction set from the SP_DCSQT. A PTS is a time stamp which provides an information control data The instruction sets that make up an SP_DCSQT are referred to as SP_DCSQT1, SP_DCSQT2, . . . , SP_DCSQTN, SP_DCSQTN+1, . . . , respectively.

The display of a sub-picture unit in ordinary playback as distinct from rapid or slow playbacks is processed as follows. The STC (System Time Clock) supplies the synchronous signal which is used by the sub-picture unit decoder as the reference. When the value of the STC reaches that of the PTS, then the SPU unit decoder clears the currently displayed SPU video data and executes the first instruction set SP_DCSQ0 of the SP_DCSQT. The nth instruction set is, as indicated above, represented as SP_DCSQN. The execution time SP_DCSQ_STM_N of this nth instruction set SP_DCSQN is individually defined and when this execution time is reached, the instruction is executed. Since the execution time SP_DCSQ_STM_0 of the first SP_DCSQ0 must be the same as that of PTS, however, the instruction must be immediately executed once the PTS time is reached.

Each instruction set contains the indication of the storage location, display location, display color, contrast, display beginning, and display end of the PXD. The DVD Standard requires that SP_DCSQ0 contain at least the minimum instructions necessary for the SPU data to be displayed. This is because it is assumed in the DVD Standard that the data only contained in this SP_DCSQ0 is sequentially decoded.

In the SPDCSQ, after certain options (color, contrast, display location, etc. ) are set, sub-picture data will be successively read out from the specified storage location of the PXD and displayed on the display monitor. When the decoder executes the instruction of SP_DCSQN, the decoder repeats to execute the above instruction until the STC reaches the execution time SP_DCSQ_STM_N+1 of the next SP_DCSQN+1. The DVD Standard requires that this instruction be executed synchronously with the vertical synchronous signal VSYN.

Since the DVD Standard further requires that the time interval of SP_DCSQ_STM be more than one video frame, one set of the PXD is necessarily executed when one sub-picture unit display beginning instruction is executed. However, in the case of the rapid playback where the STC itself is sped up by the rapid increment operation, more than one SP_DCSQT_STM exists during one video frame time. Since the SP_DCSQ is defined, in the DVD Standard, as an update from the result of the SP_DCSQ at the last execution time, it is not allowed to skip the SP_DCSQ. Accordingly, even if the STC is far ahead, commands have to be executed one by one. This is another reason why rapid execution is difficult to accomplish.

In order to overcome this difficulty, the DVD Standard assumes that only the first instruction of each sub-picture unit is executed. Thus, as already mentioned above, all the minimum instructions (color, contrast, display location, etc.) that are needed to display the SPU data must be included in SP_DCSQ0. However, in such a conventional rapid playback method that the DVD Standard originally assumes, the upgrade interval of the display depends upon the stream which is the time interval of each unit. It is difficult for the sub-picture to be smoothly played back and the display tends to be irregular because such a time interval is not constant and the length of the stream is variable. Further, since the update depends upon the stream, it is impossible for the update and display to be precisely synchronized, thereby making the display timing between the main and sub pictures imprecise. Additionally, since only the first instruction SP_DCSQ0 of the SPU is executed, all the interim commands existing up to the beginning of the next unit are ignored and abandoned, so that the video data displayed on the screen will appear to be a series of discontinuous frames, thereby resulting in unsmooth playback.

SUMMARY OF THE INVENTION

The objective of the present invention is to provide an improved system and method for performing a rapid playback of sub-picture units within a DVD player.

In accordance with an embodiment of the invention, a system is provided for rapidly playing back SPU's which include information for sub pictures. This system comprises comparison means for comparing the system time clock (STC) with the execution time of the instruction set that provides display control in the sub-picture units (SP_DCSQ_STM_N); means for forcing the display of pixel data (PXD) contained in a sub-picture unit to suspend operation and to proceed to instruction interpretation of the instruction set in a next sub-picture unit if said comparison means determines, when the sub-picture units are being rapidly played back, that the system time clock performing a rapid increment operation has a greater value than the execution time of a next instruction set (SP_DCSQ_STM N+1) and means for continuously repeating the instruction interpretation until the execution time of the instruction set coincides with the system time clock.

In accordance with another embodiment of the invention, a method is provided for rapidly playing back, in a digital video disk (DVD) player, sub-picture units which contain sub-picture information. This method comprises the steps of: comparing the system time clock (STC) with the execution time of an instruction set that provides display control in the sub-picture units (SP_DCSQ_STM_N); forcing the display of pixel data (PXD) contained in a sub-picture unit to suspend operation and to proceed to instruction interpretation of the instruction set in a next sub-picture unit if said comparison means determines, when the sub-picture units are being rapidly played back, that the system time clock performing a rapid increment operation has a greater value than the execution time of a next instruction set (SP_DCSQ_STM_N+1) and continuously repeating the instruction interpretation until the execution time of the instruction set coincides with the system time clock.

The above-mentioned system and method may be implemented as a part of or as a function of a part of an LSI.

BRIEF DESCRIPTION OF THE DRAWINGS

Other objects and advantages of the invention will become apparent upon reading the following detailed description and upon reference to the accompanying drawings in which:

FIG. 1 is a flow chart showing the SPU playback steps at a normal speed.

FIG. 2 is a flow chart showing the rapid SPU playback steps in accordance with the present invention.

FIG. 3 is a block diagram of the hardware construction implementing the rapid SPU playback in accordance with the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 shows a flow diagram for decoding sub-picture units (SPU) in an ordinary manner which does not include, for example, a rapid playback. At step 12, the vertical synchronization is confirmed. This is because the definition in the DVD Standard requires that commands be executed at the timing of the vertical synchronization (V_SYNC). The system time clock (STC) is also checked synchronously with the vertical synchronization. Therefore, even when the time is up in the middle of a frame, the system will wait until the beginning of the next frame and the switching does not suddenly occur in the middle of a picture. Then at step 14, the STC and SP_DCSQ_STM_N are compared. When the STC catches up with the command execution time SP_DCSQ_STM_N (in the case of YES at step 14), the contents of the command is executed and the pixel data (PXD) will be played back, thereby displaying the bitmap (step 18).

FIG. 2 shows a flow diagram for decoding process of sub-picture units in rapidly playing them back, wherein the process includes the double-check mechanism of the present invention. In FIG. 2, the steps same as or similar to those of FIG. 1 are referred to by using the same reference numerals. In the process of the rapid playback, the system time clock is also rapidly incremented. Therefore, in a triple rapid playback, for example, the value of the system time clock is increased three times as rapid as in the normal speed decoding. The same steps up to the command analysis of step 16 are executed even for a rapid playback as in the case in the ordinary one. Normally, the value of SP_DCSQ_STM is greater than the system time clock. In the case of a rapid playback, however, after step 16, the system determines whether the system time clock is more than one command set ahead of the execution time of the command set. In other words, the system time clock (STC) is compared with a next instruction set, and if the system time clock which is rapidly incrementing because of the rapid playback is ahead of SP_DCSQ_STM_N+1 (in the case of YES at step 20), then the display of the pixel data (PXD) is skipped and the system proceeds to an instruction interpretation of SP_DCSQ (step 24). In this case, the synchronization to VSYNC is also suspended and the instruction interpretation will be continuously and rapidly repeated. This instruction interpretation is on the display screen performed during the vertical blanking period between VSYNC and the active video region. When SP_DCSQ_STM catches up with the system time clock, this skip mode is cleared and a normal playback resumes.

By thus controlling the decoding, the above-mentioned problems are overcome and a rapid and at the same time smooth playback is made available. In other words, as will be discussed in detail, the configuration of the present invention provides a significant improvement over prior art decoders with respect to (1) the synchronization characteristics and (2) the continuity of the played back sub-pictures.

With respect to the synchronization characteristics, in accordance with the present invention, the display of sub-picture units is updated completely synchronously with the system time clock. Therefore, if we assume the update interval in the case of the normal playback is 1, then the update interval of a playback N times as rapid as the normal playback will be fixed to 1/N and the displayed sub-picture units as seen by viewers will proceed constantly N times as rapid, which makes the playback as smooth as in case of a normal VTR. As already mentioned above, in a SPU playback scheme that the DVD Standard originally assumes, the update interval will be variable due to the variable length of the unit of sub-picture units. Thus, when sub-picture units are rapidly played back, one same image will stay for a certain period of time, suddenly continuous updates are provided, and then another same image will appear and stay again, thereby resulting in an unsmooth playback. In other words, in a conventional rapid playback of sub-picture units, the sub-picture is not necessarily synchronous with the main picture, which visually gives worse influences than the actual gap does. The present invention does provide better visual impression than in the case of the conventional playback system.

Secondly, in accordance with the present invention, a better continuity of images is obtained than in the case of conventional play back schemes where only the first sub-picture of each of the sub-picture units is played back and displayed. If the number of the video frames to be played back in one sub-picture unit is assumed to be fifteen, then all the fifteen video frames will be played back and displayed both in conventional decoding schemes and the decoding scheme in accordance with the present invention when the frames are played back at a normal speed. On the other hand, when the video frames are played back three times as rapid, five frames of the sub-pictures may be played back in accordance with the method of the present invention. In the conventional playback scheme or the scheme originally assumed by the DVD Standard, as pointed out repeatedly, only the first frames are played back. In view of the continuity of the displayed images, such a playback will result in a very coarsely sequenced scenes, which is totally different form the one obtained by the present invention.

In FIG. 3, a block diagram of the hardware constructed to implement the above-mentioned rapid sub-picture unit playback scheme is shown. More particularly, SPU decoder 30 is shown within the outer dotted lines and SPU controller unit 38 is shown within the inner dotted lines. If the system time clock check circuit 34 determines STCSP_DCSQ_STM_N+1 (step 20 of FIG. 2) and issues a command to skip the PXD toward SPU controller 36, SPU controller 36, which is a fast state machine (FSM), provides PXD decoder 42, address generator and FIFO controller 44 with a command to repeatedly output the same PXD or in other words a command not to update the PXD.

FSM 36 controls the entire SPU control block (inside of the outer dotted lines) and performs the SP_DCSQ command analysis. FSM 36 begins the decoding by reading PTS and SP_DCSQ_STM, which are required to trigger the beginning of the decoding, out of SPU streams stored in DRAM 40 via the DRAM address generator and FIFO controller 44 and set them timer check circuit 34. When the timer check circuit issues a status showing that the STC has reached the command execution time, the system extracts the required commands out of the SPU stream of DRAM 40 and set them to PXD decoder 42. All the processing must be, as already mentioned above, completed during the vertical blanking period of the video display. Thereafter, SPU controller (FSM) 36 provides PXD decoder 42 with a command to start the decoding after it gives DRAM address generator and FIFO controller 44 a command to read out the PXD. The PXD decoder 42 proceeds with the PXD decoding on a real time basis in accordance with the synchronous signals from a video display controller. If a signal indicative of skipping the PXD (Skip_PXD) is issued from STC check circuit 34, the reading-out of the PXD is forced to be suspended and only the command interpretation is continuously performed until the status Skip_PXD disappears. After that, PXD decoder 42 will continue to be controlled as mentioned above.

STC check circuit 34 issues the Skip PXD status to FSM 36 when it concludes STCSP_DCSQ_STM_N+1 after comparing these two values at step 20 of FIG. 2. Further, STC check circuit 34 gives a report as to whether the value of the STC has reached the command display time shown by the preset PTS and SP_DCSQ_STM_N.

Register 46 is a communication register which exchanges information and commands between FSM 36 and STC check circuit 34. The PTS and SP_DCSQ_STM_N which are used by STC check circuit 34 are also exchanged via this register 46.

DRAM address generator and FIFO controller 44 generates read addresses which are used for the SP_DCSQ and PXD to be read at an appropriate timing out of DRAM 40 where SPU streams are stored. Further, this DRAM address generator and FIFO controller 44 has the PXD repeat continuously make access to the same PXD storage address as well as performs a complicated address generation such as extracting time-stamps from the next instruction or an SPU currently being executed in order for the STC to be checked.

PXD decoder 42 decodes the PXD data read out of DRAM 40 on the basis of the read address generated by DRAM address generator and FIFO controller 44. Although the PXD within the SPU stream is encoded by a special run-length method, PXD decoder 42 is a fast hardware decode engine which can decode this PXD on a real time basis at the same speed as the scan speed of the video scan lines.

Although the SPU streams are stored in DRAM 40 which is an external memory, controller 44 controls with respect to SPU controller 36 so as not to read out the PXD but to read out the next command. In accordance with an embodiment of the invention, when the PXD is displayed, every SPU stream stored in DRAM 40 is repeatedly read out and displayed via PXD decoder 42 on a real time basis. In other words, no to update the PXD means that every frame is read out and the same frame is written in. Namely, the read out pointer of the PXD is fixed. Although it may be possible for a certain frame storage device to be installed and to store the same SPU after having completed the decoding thereinto, a less expensive and more simple decoder can be achieved by constructing as discussed above.

Numerous variations and modifications will become apparent to those skilled in the art once the above disclosure is fully appreciated. It is intended that the following claims be interpreted to embrace all such variations and modifications.

What is claimed is:

1. A system for rapidly playing back, in a digital video disk (DVD) player, sub-picture units (SPU's) which contain sub-picture information, the system comprising:

a comparator for comparing the time of a system time clock (STC) with the execution time of an instruction set, said instruction set configured for providing display control in a sub-picture unit;

a forcing mechanism for forcing the display of pixel data (PXD) in said sub-picture unit to suspend operation and proceed to instruction interpretation of an instruction set in a next sub-picture unit if said comparator determines, when said sub-picture units are being rapidly played back and said system time clock is performing a rapid increment operation, that said system time clock has a value greater than an execution time of a next instruction set; and a repeater for continuously repeating instruction interpretation until an execution time of an instruction set coincides with a current time of a system time clock.

2. The system recited in claim 1 wherein the system is implemented as part of a large scale integrated (LSI) circuit.

3. A method for playing back, in a digital video disk (DVD) player, sub-picture units which contain sub-picture information, the method comprising:

comparing the time of a system time clock (STC) with the execution time of an instruction set, wherein said instruction set is configured to provide display control in a sub-picture unit;

forcing the display of pixel data (PXD) contained in a sub-picture unit to suspend operation and to proceed to instruction interpretation of the instruction set in a next sub-picture unit if a comparator determines, during rapid playback of a plurality of sub-picture units, that the system time clock performing a rapid increment operation has a value greater than the execution time of a next instruction set; and continuously repeating the instruction interpretation until the execution time of the instruction set coincides with the time of said system time clock.

4. The method as recited in claim 3 wherein the method is implemented as a function of part of a large scale integrated (LSI) circuit.

5. A computer readable storage medium in which software is stored for performing the method recited in claim 3.

6. The system as recited in claim 1, wherein said system includes a computer readable storage medium, said computer readable storage medium configured for storing software for said comparator, said forcing mechanism, and said repeater.

7. The system as recited in claim 6, wherein said computer readable storage medium is a dynamic random access memory (DRAM).

8. The system as recited in claim 7, wherein said sub-picture units are stored in said DRAM.

9. The system as recited in claim 1, wherein said system includes a pixel data decoder for decoding pixel data.

10. The system as recited in claim 9, wherein said comparator includes timer check circuit, said timer check circuit configured to indicate when said system time clock has reached a command execution time.

11. The system as recited in claim 10, wherein said timer check circuit is configured to issue a skip signal responsive to said timer check circuit determines that said system time clock has a value greater than the execution time of said next instruction set.

12. The system as recited in claim 11, wherein said system includes a fast state machine, wherein said fast state machine is configured to receive said skip signal from said timer check circuit.

13. The system as recited in claim 12, wherein said fast state machine is configured for sending a command to said pixel data decoder to repeatedly output the same pixel data, said sending of command responsive to receiving a skip signal from said timer check circuit.

14. The method as recited in claim 5, wherein said computer readable medium is a dynamic random access memory (DRAM).

15. The method as recited in claim 3, wherein said pixel data is decoded by a pixel decoder.

16. The method as recited in claim 15, wherein said comparing the time of a system time clock (STC) with the execution time of an instruction set is performed by a comparator, said comparator including a timer check circuit.

17. The method as recited in claim 16 further comprising said timer check circuit indicating when said system time clock has reached a command execution time.

18. The method as recited in claim 17 further comprising said timer check circuit issuing a skip signal responsive to determining said system time clock has a value greater than the execution time of said next instruction set.

19. The method as recited in claim 18 further comprising a fast state machine receiving said skip signal from said timer check circuit.

20. The method as recited in claim 19 further comprising said fast state machine sending a command to said pixel data decoder to repeatedly output the same pixel data, said sending of command responsive to receiving a skip signal from said timer check circuit.

* * * * *